US011906931B2

(12) United States Patent
Le Gall

(10) Patent No.: US 11,906,931 B2
(45) Date of Patent: Feb. 20, 2024

(54) TIMEPIECE COMPONENT

(71) Applicant: PATEK PHILIPPE SA GENEVE, Geneva (CH)

(72) Inventor: Eric Le Gall, Nyon (CH)

(73) Assignee: PATEK PHILIPPE SA GENEVE, Geneva (CH)

(*) Notice: Subject to any disclaimer, the term of this patent is extended or adjusted under 35 U.S.C. 154(b) by 1195 days.

(21) Appl. No.: 16/493,868

(22) PCT Filed: Mar. 5, 2018

(86) PCT No.: PCT/IB2018/051398
§ 371 (c)(1),
(2) Date: Sep. 13, 2019

(87) PCT Pub. No.: WO2018/167599
PCT Pub. Date: Sep. 20, 2018

(65) Prior Publication Data
US 2021/0124308 A1 Apr. 29, 2021

(30) Foreign Application Priority Data
Mar. 16, 2017 (EP) .................................... 17161386

(51) Int. Cl.
*G04B 19/04* (2006.01)
*A44C 17/04* (2006.01)
(Continued)

(52) U.S. Cl.
CPC .......... *G04B 19/042* (2013.01); *A44C 17/043* (2013.01); *A44C 27/00* (2013.01); *G04B 47/042* (2013.01)

(58) Field of Classification Search
CPC .... G04B 19/042; G04B 19/04; G04B 47/042; A44C 17/043; A44C 27/00
See application file for complete search history.

(56) References Cited

U.S. PATENT DOCUMENTS 5,119,350 A 6/1992 Delacretaz et al.
5,323,732 A 6/1994 Consolo
(Continued)

FOREIGN PATENT DOCUMENTS

CH 3457 A 9/1891
CH 314048 A 5/1956
(Continued)

OTHER PUBLICATIONS

Machine Translation of CH 712114 (Year: 2016).*
(Continued)

*Primary Examiner* — Edwin A. Leon
*Assistant Examiner* — Jason M Collins
(74) *Attorney, Agent, or Firm* — NIXON & VANDERHYE

(57) ABSTRACT

Disclosed is a timepiece component including at least one housing intended to receive at least one precious or non-precious stone and including at least one first end, referred to as the setting end, and a rail. The rail is located on the periphery of the housing, and is arranged to allow the stone or stones to be inserted into the rail at the first end of the housing, such that the stone or stones can slide in the rail along the longitudinal axis of the housing, and to hold the stone or stones once inserted into the rail in a direction perpendicular to the longitudinal axis of the housing.

17 Claims, 5 Drawing Sheets

(51) Int. Cl.
*A44C 27/00* (2006.01)
*G04B 47/04* (2006.01)

(56) References Cited

U.S. PATENT DOCUMENTS

| | | | | |
|---|---|---|---|---|
| 5,419,159 | A | 5/1995 | Muller | |
| 5,896,757 | A | 4/1999 | Kharloubian | |
| 8,400,883 | B2 * | 3/2013 | Lin | G04B 19/042 368/228 |
| 10,768,578 | B2 * | 9/2020 | Tortora | G04C 10/02 |

FOREIGN PATENT DOCUMENTS

| | | | |
|---|---|---|---|
| CH | 316204 | A | 9/1956 |
| CH | 327795 | A | 2/1958 |
| CH | 712114 | A1 | 8/2017 |
| CN | 201563755 | U | 9/2010 |
| CN | 204444501 | U | 7/2015 |
| EP | 0489325 | A1 | 6/1992 |
| EP | 0527111 | A1 | 2/1993 |
| EP | 0555753 | A1 | 8/1993 |
| EP | 0574360 | A1 | 12/1993 |
| EP | 2397923 | A1 | 12/2011 |
| EP | 3035128 | A1 | 6/2016 |
| FR | 2584206 | A1 | 1/1987 |
| FR | 2632426 | A1 | 12/1989 |
| FR | 2646935 | A1 | 11/1990 |
| FR | 2774567 | A1 | 8/1999 |
| JP | S51-073063 | U | 6/1976 |
| JP | H05-184418 | A | 7/1993 |
| KR | 10-0191840 | B1 | 6/1999 |

OTHER PUBLICATIONS

Office Action issued in Korean Patent Application No. 10-2019-7026774 dated Jul. 15, 2022.

International Search Report, dated Jun. 11, 2018, from corresponding PCT application No. PCT/IB2018/051398.

Office Action issued in Japanese Patent Application No. 2019-550812 dated Jan. 4, 2022.

Office Action issued in Chinese Patent Application No. 201880018350.7 dated Sep. 7, 2020.

* cited by examiner

TIMEPIECE COMPONENT

BACKGROUND OF THE INVENTION

Field of the Invention

The present invention relates to a timepiece component in which or on which at least one precious or non-precious stone can be set. The present invention in particular relates to a hand.

Description of the Related Art

The hands of a timepiece are generally slim and fragile elements. To decorate a hand or to make it more visible, it is known to use a luminescent paint to cover or fill a recess in the hand or to set a precious or non-precious stone in the hand. The traditional setting of a stone on a component as fragile as a hand, however, presents a significant risk of deforming said hand, irrespective of the shape of the stone (faceted or flat as outlined in CH 3457).

The document EP 0 574 360 describes a hand comprising at least one housing for receiving a precious or non-precious stone and tightening means having the shape of two strips extending on each side of the housing along the longitudinal axis of the hand and for keeping the stone in said housing. These strips have to be malleable for the setting of the stone(s) in their housing. As with traditional setting, deforming these strips to guarantee satisfactory fixing of the stone can cause deformation of the hand. Additionally, in this document, said tightening strips are in a separate plane not parallel to the plane of the hand, which increases the height and the volume of said hand and detracts from the general appearance of the hand.

SUMMARY OF THE INVENTION

The present invention aims to produce a timepiece component, in particular a hand, in which or on which a precious or non-precious stone can be set which allows easy and secure setting of said stone and which can be attractive while limiting the deformation of the component during setting.

The present invention relates to a timepiece component as claimed in claim 1, a timepiece comprising said timepiece component as well as a method for setting a precious or non-precious stone in or on said timepiece component.

BRIEF DESCRIPTION OF THE DRAWINGS

The accompanying drawings illustrate an embodiment of the invention.

BRIEF DESCRIPTION OF THE DRAWINGS

Figure 1:
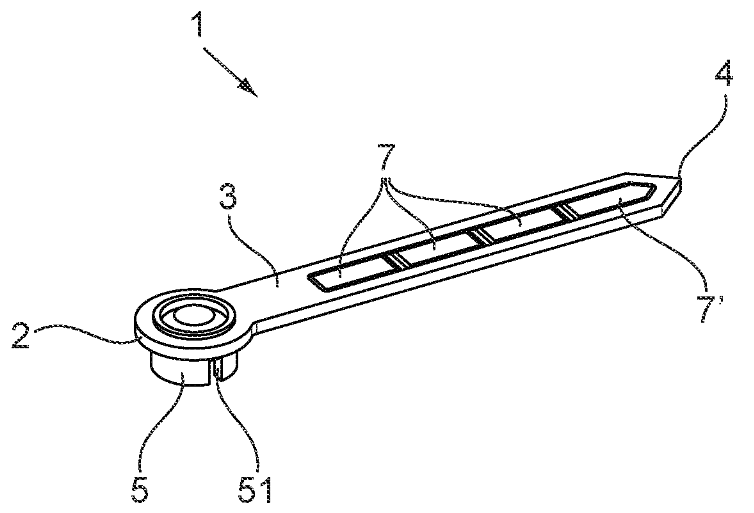
FIGS. 1 and 2 illustrate a minute hand in accordance with the invention seen in a perspective view from above and below respectively.
Figure 2:
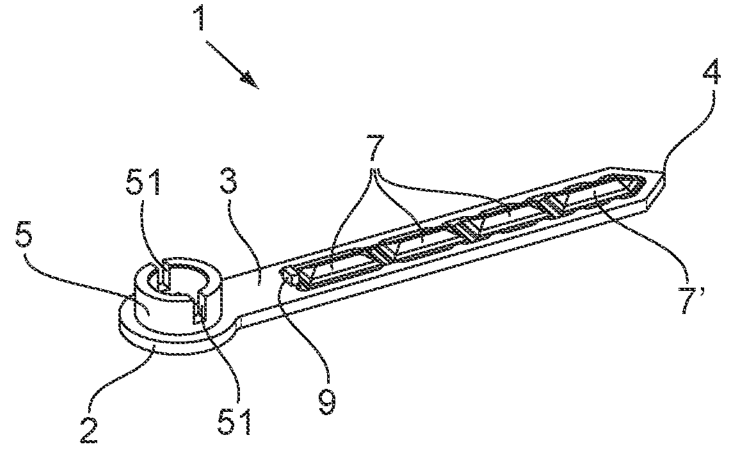

In the embodiment illustrated in the figures, the timepiece component in accordance with the invention is a hand 1, in particular a minute hand, for equipping a timepiece movement. The hand 1 is formed in the conventional manner of a head 2 connected to a main body formed by a plate 3 terminated by a point 4. A barrel 5 penetrates the head 2 for fixing the hand 1 on a minute cannon-pinion of the movement.

In accordance with the invention, the hand 1 comprises in its plate 3 at least one housing 6 for receiving at least one precious or non-precious stone 7, 7'. Preferably, the housing 6 is through-going, namely it does not have a base. In the embodiment illustrated, the housing 6 is shaped to receive four precious stones 7, 7' having the baguette shape, and in particular the shape of a baguette diamond, and it extends as far as the point 4 of the hand 1. Said housing 6 comprises in particular a first end, referred to as a setting end 61, and a second end, referred to as a point end 62.

Figure 3:
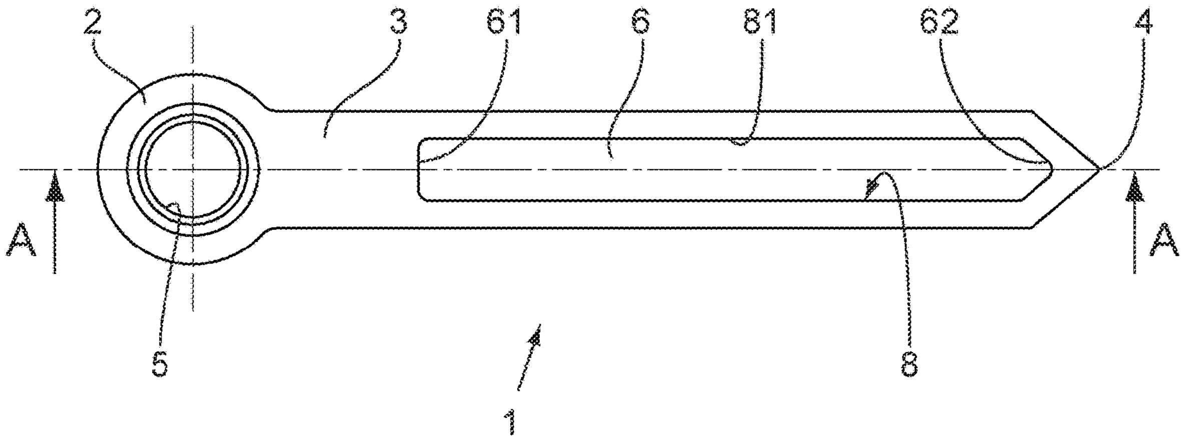
FIG. 3 is a view from above of the hand of FIG. 1 before the setting of the stones.
Figure 7:
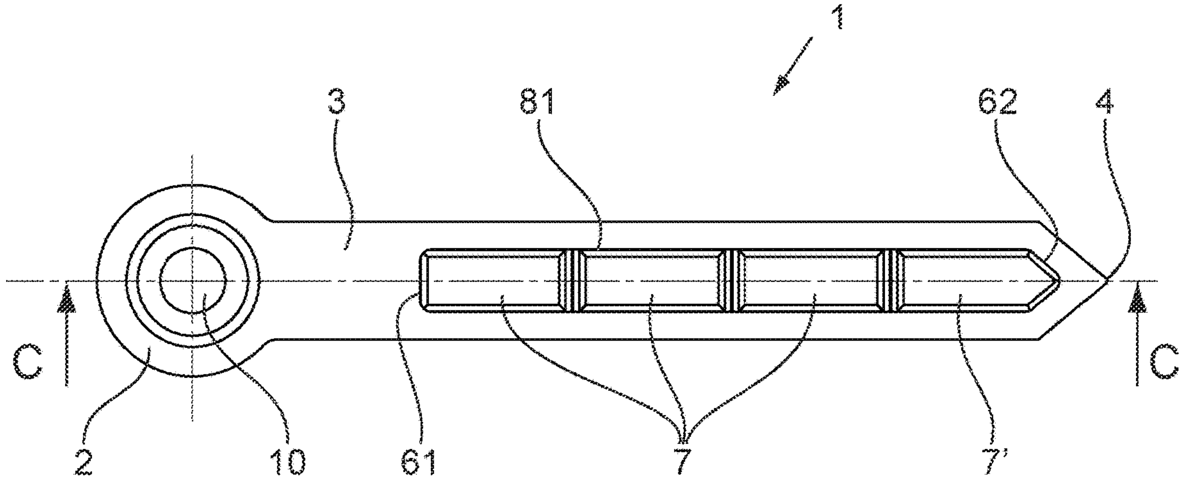
FIG. 7 is a view from above of the hand of FIG. 1 once the stones are set in their housing.

The housing 6 has a rail 8 over its entire periphery. Generally, the rail 8 is shaped to:

- allow the stones 7, 7' to be inserted in said rail 8 and to slide therein along the longitudinal axis of the housing 6 (here coinciding with the longitudinal axis of the hand, axis A-A of FIG. 3 or C-C of FIG. 7);
- hold the stones 7, 7' in both directions perpendicular to the longitudinal axis of the housing, at least when these are in their final set position.

Figure 4:
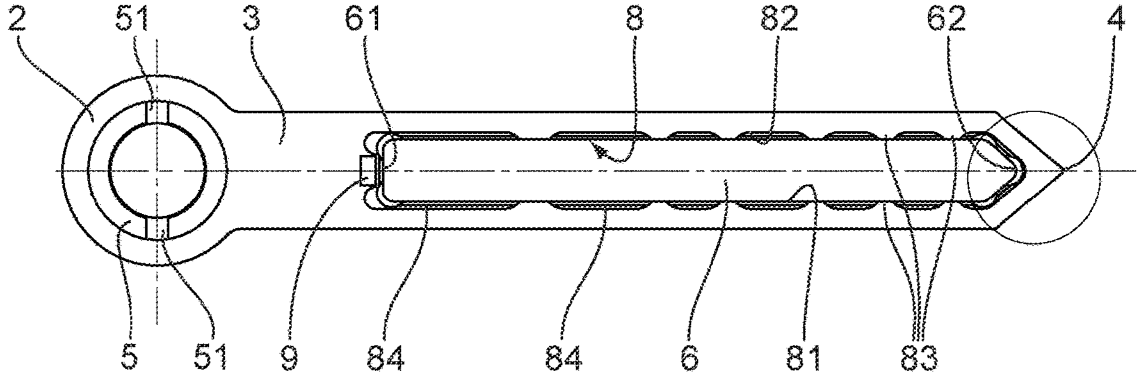
FIG. 4 is a view from below of the hand of FIG. 1 before the setting of the stones.
Figure 5:
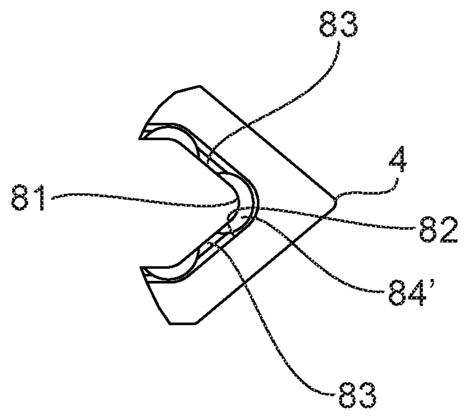
FIG. 5 illustrates in detail the point of the hand of FIG. 4.
Figure 6:
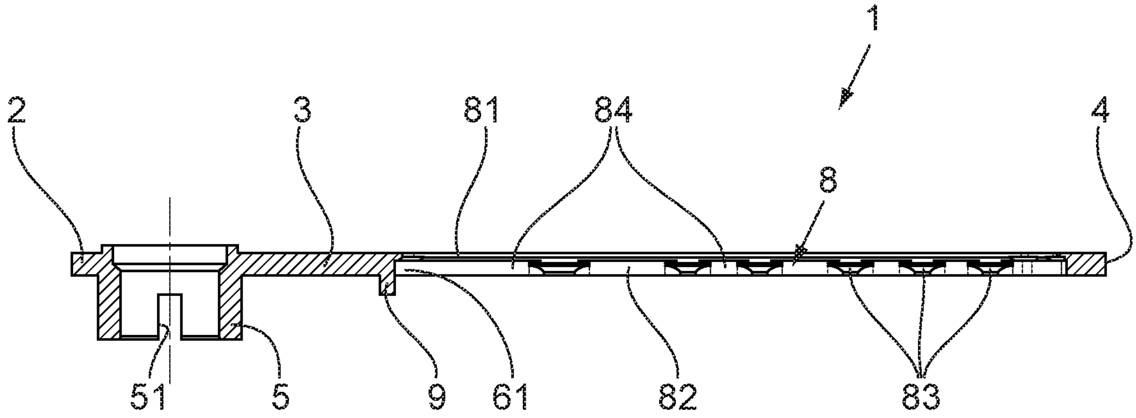
FIG. 6 is a sectional view along the axis A-A of the hand of FIG. 3.
Figure 8:
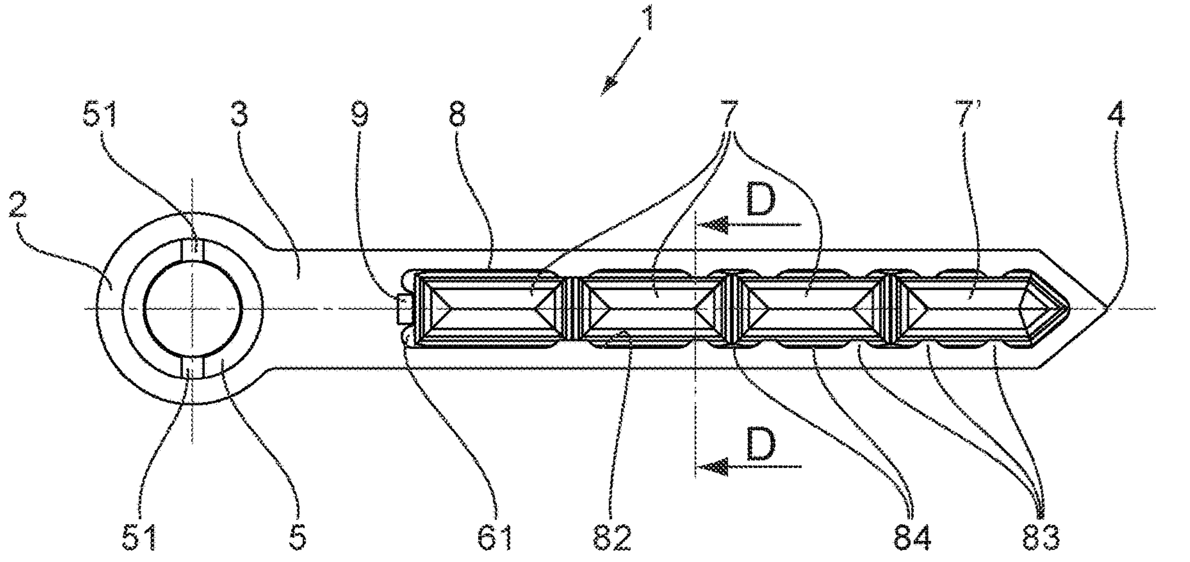
FIG. 8 is a view from below of the hand of FIG. 1, once the stones are set in their housing.
Figure 10:
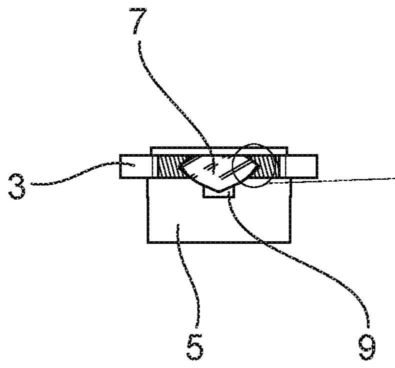
FIG. 10 is a sectional view along the axis C-C of the hand of FIG. 8.
Figure 11:
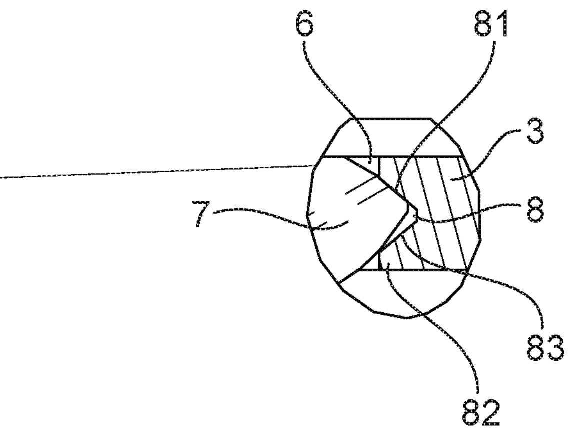
FIG. 11 illustrates a detail of FIG. 10.

In the embodiment illustrated in the figures, the rail 8 comprises an upper rail 81 visible when the hand 1 is viewed from above and continuous over all the periphery of the housing 6 (see FIGS. 1, 3 and 7 in particular). A lower rail 82 complements the upper rail 81. The lower rail 82 is not continuous: it is formed of multiple tabs 83 separated by empty spaces 84, as illustrated in FIG. 4. The tabs 83 are distributed over the periphery of the housing 6 to make it possible to hold each of the four stones 7, 7' when they are in their final set position (see FIGS. 8, 10 and 11) and also to make it possible to insert the stones 7, 7' in the rail 8 during setting. To this end, and as illustrated in FIGS. 4, 6 and 8, there are no tabs 83 at the setting end 61 of the housing 6 to allow a tilting movement of the stones 7, 7' for their insertion in the rail 8 during setting.

In the embodiment illustrated, the point end 62 of the housing 6 having a pointed shape to match the point 4 of the hand 1, the empty spaces 84' at this end 62 preferably have a particular shape to allow the suitable positioning of a point stone 7' and its particular facets cut according to the shape of the point 4 of the hand 1.

Figure 9:
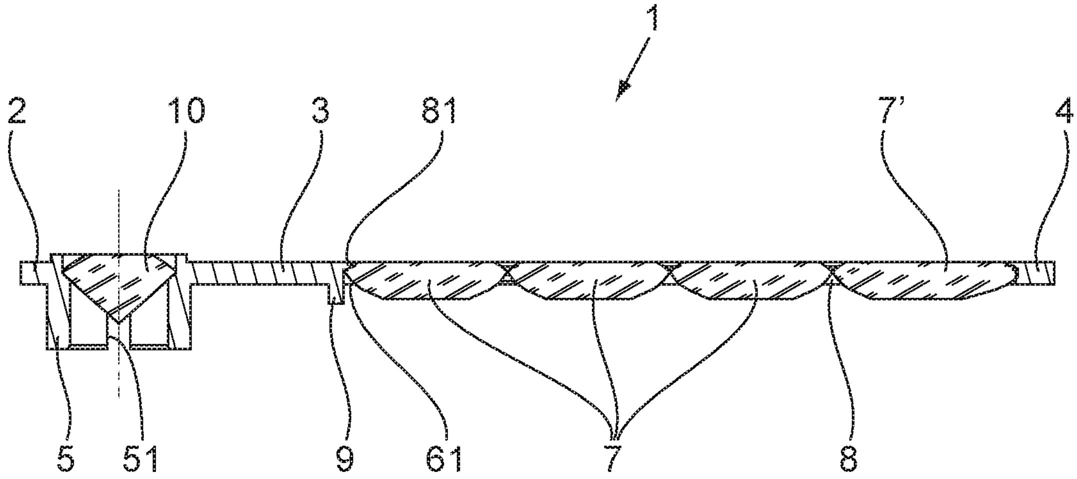
FIG. 9 is a sectional view along the axis C-C of the hand of FIG. 7.

Finally, the hand 1 further comprises a setting stud 9 placed on the plate 3 at the setting end 61 of the housing 6. The setting stud 9 is deformable and after having been deformed allows blocking of the stone(s) 7, 7' in the housing 6 once they have been set in their final position. FIG. 9 illustrates the stones in their final set position and the setting stud 9 before deforming: once the setting stud 9 is folded over the final stone, it is no longer possible to move said stones 7 in the rail 8 irrespective of the direction of movement (parallel or perpendicular to the longitudinal axis of the housing 6).

The setting of the stones 7, 7' in the hand 1 is described in detail hereinafter.

Preferably, the hand 1 is placed, face down, on a fitting comprising a recess in the shape of the hand 1 to avoid "the ripping open" of the hand 1 and of the housing 6 due to the fact that said housing 6 is through-going in this embodiment.

In the embodiment illustrated, the four stones to set 7, 7' are baguette diamonds, one of them 7' having a pointed end to match the shape of the point 4 of the hand 1.

The stones 7, 7' are inserted one by one in the rail 8 through the setting end 61 of the housing 6, beginning with the end stone 7'. As said setting end 61 does not comprise tabs 83 on the lower rail 82 of the rail 8, it is possible to insert each stone 7, 7' between the upper rail 81 and the lower rail 82 by a tilting movement.

Each of the stones 7, 7' is then slid in the rail 8 until its final position. Once all the stones 7, 7' are in their final position, the setting stud 9 is deformed and folded back onto the final stone 7 to block this in a direction perpendicular to the longitudinal axis of the housing 6 and to also block all the stones 7, 7' in a direction parallel to said longitudinal axis. Therefore, the stones 7, 7' can no longer slide in the rail 8 nor tip out of the rail 8 through the setting end 61 of the housing 6.

Deformation of the setting stud necessary to definitively block the stones 7, 7' in the housing 6 is only minimal and only generates a little force on the hand 1 in itself, thereby avoiding the risk of the hand 1 deforming as a whole.

Preferably, a central stone 10 is still set in the conventional manner in the barrel 5 of the hand 1. In that case and in order to ensure an appropriate insertion of the hand 1 on the minute cannon-pinion of the timepiece movement that it is intended to equip, the barrel 5 of said hand 1 further comprises preferably two slots 51. These slots 51 make it possible to square the barrel 5 for its adjustment on the minute cannon-pinion, even after the setting of the central stone 10.

A timepiece component is thereby produced wherein one or more precious or non-precious stones can be set easily and securely while maintaining a perfect appearance (see FIGS. 1 and 7, the upper rail 81 visible from above is continuous and the setting stud 9, located on the lower face of the hand, is thereby hidden once the hand is mounted in its final position on the timepiece movement). Additionally, the forces on the component during setting which could generate deformations of said component are greatly reduced, since only a single element (a stud), of which the size can be greatly reduced, now has to be deformed. The setting is moreover greatly facilitated (in particular saving time).

The invention claimed is:

1. A hand for a timepiece comprising at least one housing for receiving at least one precious or non-precious stone and comprising at least one first end, referred to as a setting end, and a rail, wherein the rail is over a periphery of the housing, the rail being arranged to allow the insertion of the stone(s) in the rail at the first end of the housing, in order that the stone(s) can slide in said rail along the longitudinal axis of the housing and to retain the stone(s) once inserted in the rail in a direction perpendicular to the longitudinal axis of the housing, and further comprising a setting element located at the first end of the housing and arranged to be deformable between a first position, in which the setting element does not prevent a stone inserted in the rail from exiting same through the first end of the housing, and a second position in which the setting element prevents a stone inserted in the rail from exiting said rail and the housing.

2. The hand as claimed in claim 1, wherein the housing does not have a base.

3. The hand as claimed in claim 2, wherein the rail comprises an upper rail continuous over all the periphery of the housing and a lower rail formed of tabs alternating with empty spaces over all the periphery of the housing, no tab being present at the first end of the housing to allow the insertion of the stone(s) in the rail between the upper rail and the lower rail.

4. The hand as claimed in claim 2, wherein the housing is intended to receive at least one stone in the form of a baguette.

5. A timepiece comprising the hand as claimed in claim 2.

6. A method for setting at least one precious or non-precious stone in the hand as claimed in claim 2 comprising the following steps:

a. inserting the stone(s) one by one in the rail through the first end of the housing;
b. sliding the stone(s) in the rail as far as their final position;
c. deforming the setting element to bring the setting element into the second position in which the setting element prevents the stone(s) from exiting the rail.

7. The hand as claimed in claim 1, wherein the rail comprises an upper rail continuous over all the periphery of the housing and a lower rail formed of tabs alternating with empty spaces over all the periphery of the housing, no tab being present at the first end of the housing to allow the insertion of the stone(s) in the rail between the upper rail and the lower rail.

8. The hand as claimed in claim 7, wherein the housing is intended to receive at least one stone in the form of a baguette.

9. A timepiece comprising the hand as claimed in claim 7.

10. A method for setting at least one precious or non-precious stone in the hand as claimed in claim 7 comprising the following steps:

a. inserting the stone(s) one by one in the rail through the first end of the housing;
b. sliding the stone(s) in the rail as far as their final position;
c. deforming the setting element to bring the setting element into the second position in which the setting element prevents the stone(s) from exiting the rail.

11. The hand as claimed in claim 1, wherein the housing is intended to receive at least one stone in the form of a baguette.

12. A timepiece comprising the hand as claimed in claim 3.

13. A method for setting at least one precious or non-precious stone in the hand as claimed in claim 11 comprising the following steps:

a. inserting the stone(s) one by one in the rail through the first end of the housing;
b. sliding the stone(s) in the rail as far as their final position;
c. deforming the setting element to bring the setting element into the second position in which the setting element prevents the stone(s) from exiting the rail.

14. A timepiece comprising the hand as claimed in claim 9.

15. A method for setting at least one precious or non-precious stone in a hand as claimed in claim 1 comprising the following steps:

a. inserting the stone(s) one by one in the rail through the first end of the housing;
b. sliding the stone(s) in the rail as far as their final position;

c. deforming the setting element to bring the setting element into the second position in which the setting element prevents the stone(s) from exiting the rail.

16. The hand as claimed in claim 1, wherein the rail comprises an upper rail continuous over all the periphery of the housing and a lower rail formed of tabs alternating with empty spaces over all the periphery of the housing, no tab being present at the first end of the housing to allow the insertion of the stone(s) in the rail between the upper rail and the lower rail.

17. The hand as claimed in claim 1, wherein the housing is intended to receive at least one stone in the form of a baguette.

* * * * *